Oct. 20, 1931.　　　F. STONE　　　1,828,207
ROTARY ENGINE
Original Filed Aug. 13, 1927　　4 Sheets-Sheet 3
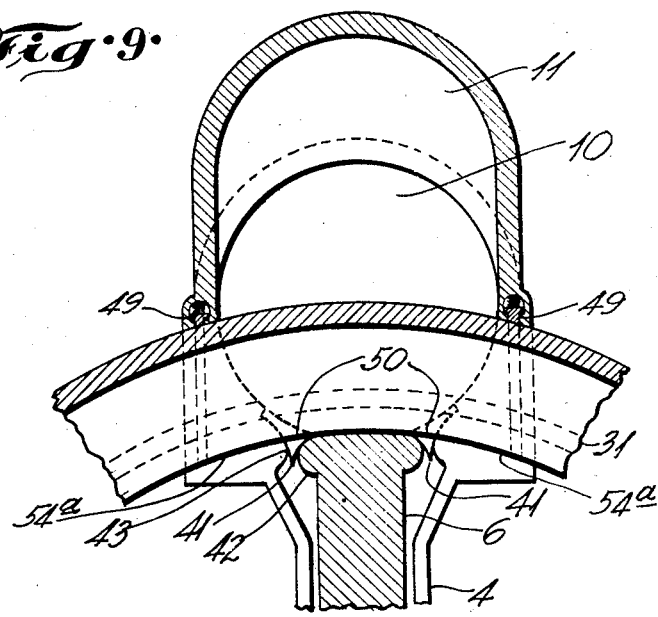
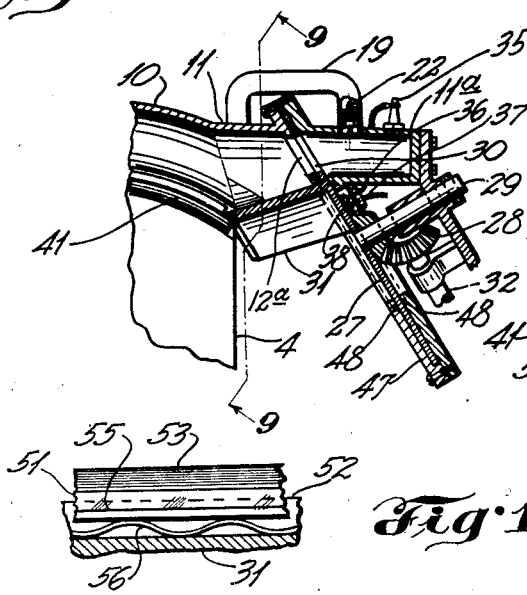
Inventor
Frederick Stone
By Adam E. Fisher
Attorney Oct. 20, 1931.  F. STONE  1,828,207
ROTARY ENGINE
Original Filed Aug. 13, 1927  4 Sheets-Sheet 4
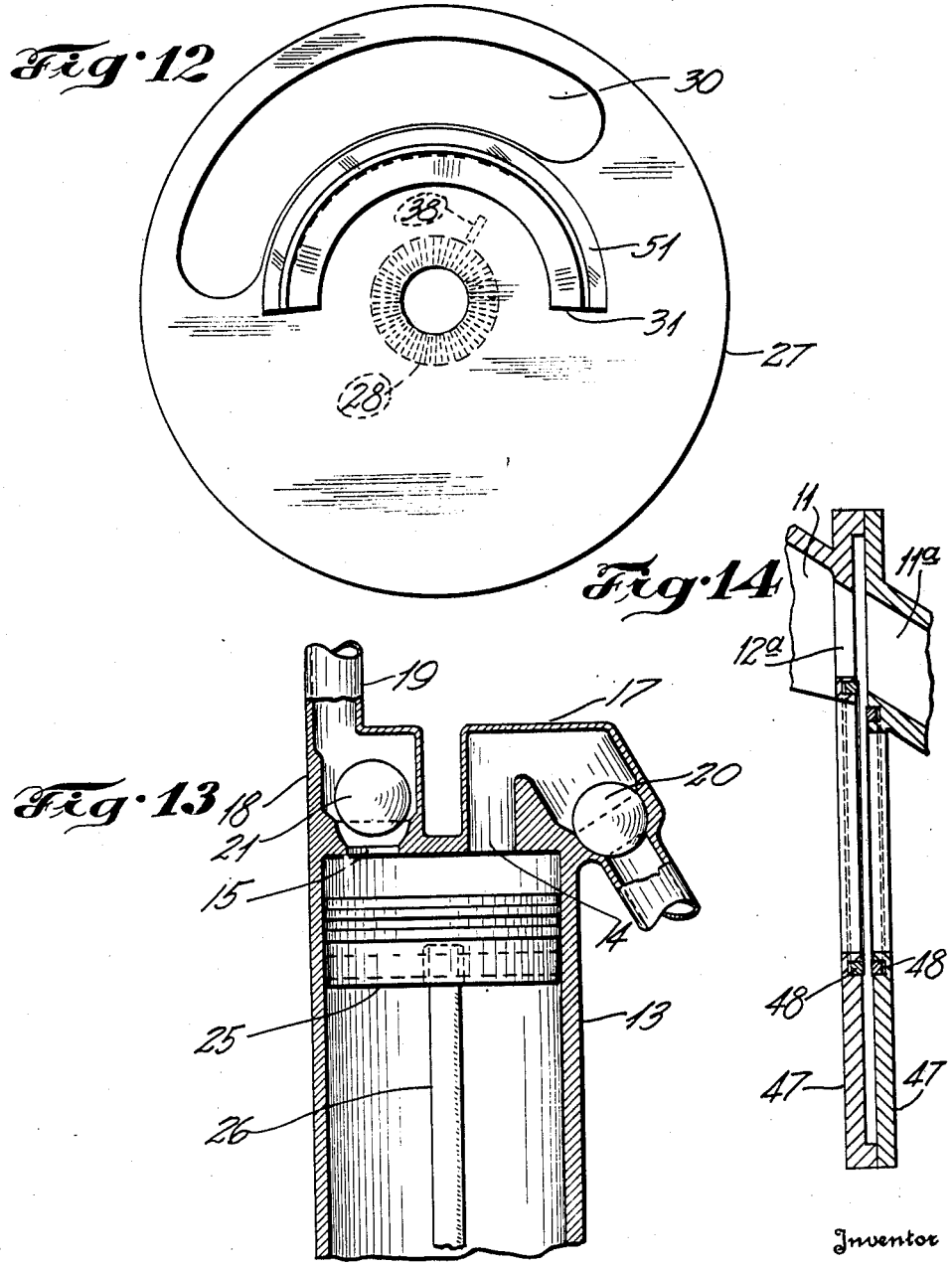
Inventor
Frederick Stone
By Adam E. Fisher
Attorney Patented Oct. 20, 1931

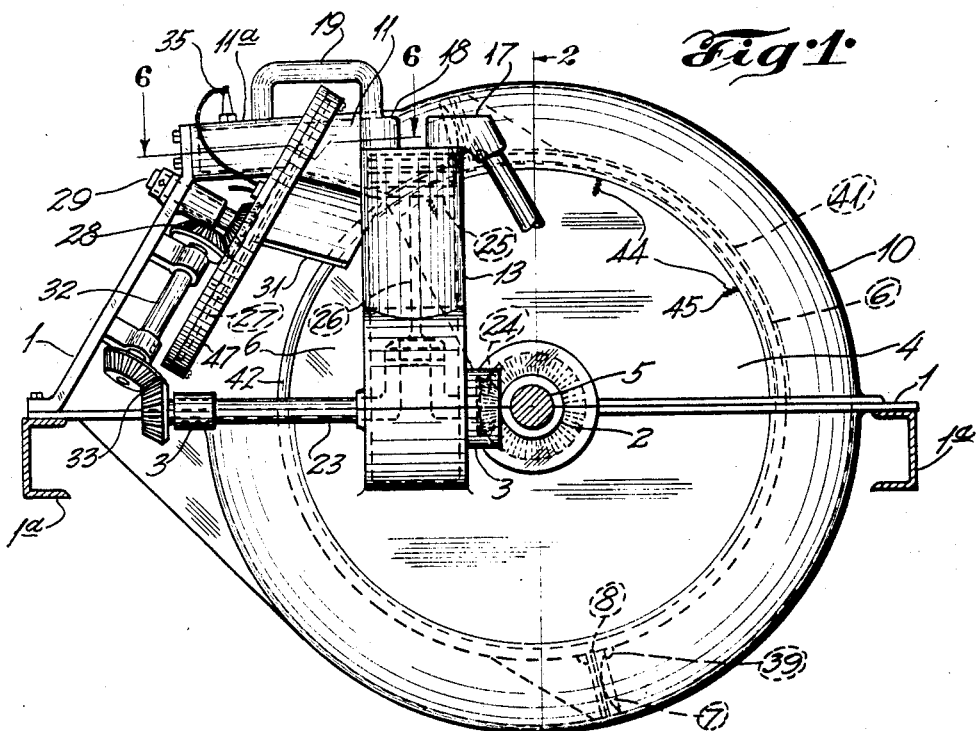

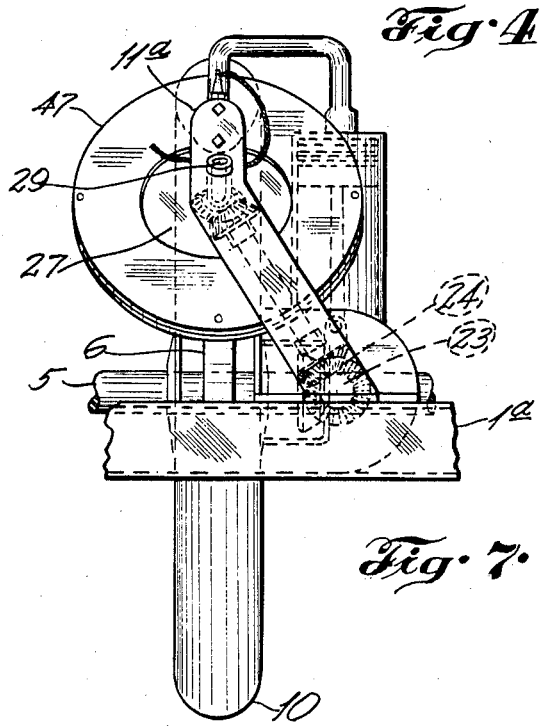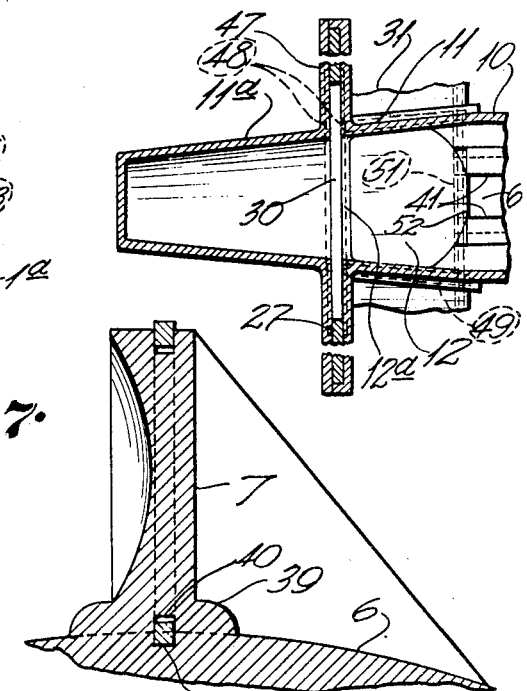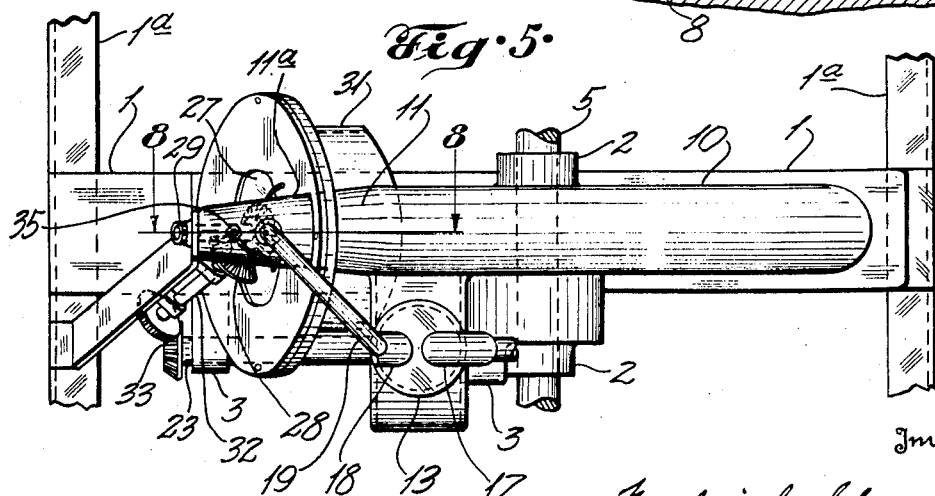

1,828,207

UNITED STATES PATENT OFFICE

FREDERICK STONE, OF RAPID CITY, SOUTH DAKOTA

ROTARY ENGINE

Application filed August 13, 1927, Serial No. 212,637. Renewed March 21, 1931.

My invention relates to rotary engines, and particularly to rotary engines of the internal combustion type, and has for one object to provide such an engine having a simple and effective means for preventing leakage and loss of pressure in the expansion chamber of the engine.

Another object is to provide such an engine in which a positive pressure is maintained upon the piston for a selected interval of time.

Another object is to provide an annular expansion chamber concentrically disposed about the shaft of the engine, said shaft having a plurality of pistons mounted thereon and operatively engaging the walls of said chamber, the movement of said pistons describing an annulus coinciding with said expansion chamber.

Another object is to provide an open ended annular chamber and a rotary valve adapted to close one of the ends of said chamber at selected intervals, whereby to form an expansion chamber between said rotary valve and one of said pistons.

Another object is to provide a shaft having a plurality of circular pistons radially mounted thereon, said pistons moving in an open ended chamber having the shape of an annulus described by the rotation of said pistons about the axis of said shaft.

Another object is to provide a rotary valve adapted to engage one of the ends of said annular chamber at selected intervals, said valve also acting to admit, at predetermined intervals, a charge of ignited combustible material between said valve and one of said pistons.

Another object is to provide an ignition chamber and combustion chamber, and a rotary valve between said chambers, normally serving to partition one chamber from the other, said combustion chamber communicating with one end of said annular chamber, and said valve acting to admit, at predetermined intervals, ignited combustible material from said ignition chamber to said combustion chamber.

Another object is to provide means for permitting the passage of said pistons through said combustion chamber into said annular chamber, said means comprising a piston aperture in the walls of said combustion chamber, and a rotary valve having an abutment adapted to engage said piston aperture for confining the ignited combustible material between said abutment and said piston, the said valve also having a port adapted to communicate said ignition chamber with said combustion chamber after said abutment has engaged said piston aperture.

Another object is to mount said pistons on a flywheel, and to provide a closure between the said pistons, said flywheel and said annular chamber, comprising a triangular acuminate packing strip having its faces respectively complementary to the pistons, the flywheel and the annular chamber.

With the above and other objects in view, my invention consists in the combination and arrangement of parts hereinafter described and claimed, and more particularly illustrated in the preferred embodiment shown in the accompanying drawings, wherein Figure 1 is a front end elevation of the engine as adapted for mounting upon the chassis of an automobile.

Figure 2 is a sectional view along the line 2—2 of Figure 1.

Figure 3 is an enlarged detail view of a portion of Figure 2.

Figure 4 is a side elevation taken from the combustion chamber side.

Figure 5 is a top plan view.

Figure 6 is a fragmentary sectional view along the line 6—6 of Figure 1.

Figure 7 is a detail of the piston.

Figure 8 is a sectional view along the line 8—8 of Figure 5, the flywheel being removed.

Figure 9 is a sectional view along the line 9—9 of Figure 8.

Figure 10 is an enlarged detail view of a portion of Figure 8.

Figure 11 is a detail of the spring set packing strip in the edge of the valve abutment.

Figure 12 is a detail of the rotary disc valve.

Figure 13 is a sectional view through the compression cylinder.

Figure 14 is a detail of the rotary valve housing, the valve being removed.

Referring now more particularly to the drawings, I provide a frame 1, here shown in connection with the chassis of an automobile, as indicated by 1a, and a drive shaft 5 journaled in bearings 2 mounted on said frame; a flywheel 6 is mounted on the drive shaft 5 and rotates therewith. A plurality of pistons 7 are radially mounted on the periphery of said flywheel; a housing 4 is mounted on the frame 1 and encloses said flywheel; the periphery of the housing is extended to form an open ended chamber 10 having the shape of an annulus described by the rotation of said pistons about the axis of said shaft; the pistons 7 operatively engage said annular chamber as hereinafter described.

A lug 39 is formed on the periphery of the flywheel 6, at the base of each of the pistons 7, and a piston ring 8 is passed through the aperture 40 in the lug, thus permitting the use of a ring of ordinary construction, and forming an effective closure between the walls of the annular chamber and the piston 7.

The flywheel 6 is also provided on its peripheral edge with laterally extending annular bulges or packing strips 42, and at the point of junction of said annular chamber 10 with the said housing 4 I provide recessed annular bulges or packing strips 43 oppositely of the bulges 42 on the flywheel.

As shown in Figure 3, I provide a pair of spring set spaced triangular acuminate packing strips 41 to form the closure between the walls of the annular chamber 10 and the periphery of the flywheel 6; said triangular acuminate strips 41 each have their upper face channeled or formed in concave section complementary to the piston ring 8, the face towards the flywheel is similarly formed complementary to the annular bulge 42 on the flywheel, and the face towards the wall of the chamber 10 is likewise formed complementary to, and adapted to be seated on, the recessed bulge 43.

The springs 44 act on pins 45 to press the acuminate strip 41 firmly against the said recessed bulge or packing seat 43 in the wall of the chamber 10; and the pressure of the piston ring 8, which arcuately engages the packing strip acts to urge the said acuminate strip firmly against the bulge or packing strip 42 on the flywheel 6, the curvature of each respective channel in the packing strip being greater than the curvature of its corresponding packing seat so as to provide an adjustable or automatically shiftable line contact therebetween, (Figure 3); by the construction described it will be seen that I provide a simple and effective closure between the piston 7, chamber 10, and flywheel 6.

The apertures 46 in the walls of the chamber 10 through which are passed the pins 45 are substantially larger than the pins 45 in order to permit the requisite movement necessary to firmly seat the acuminate strips, as described. In the embodiment shown, the acuminate strips extend only partially around the circumference of the annular chamber, but it will be readily seen that they may be co-extensive with the chamber, at the option of the person constructing the engine.

A combustion chamber 11 is provided at one end of the said annular chamber 10, and extends tangentially thereto; the combustion chamber is adapted to have the pistons pass therethrough as by a piston aperture 12 provided in the walls of said combustion chamber; the walls of the said aperture providing a valve seat; an inlet aperture 12a is provided in the outer wall of the combustion chamber, the walls of the inlet aperture also provide a valve seat which is angularly disposed to the valve seat provided by the walls of the piston aperture; and is adapted to be engaged by a rotary disc valve 27 having its face disposed tangentially to the chamber 10, which normally acts to close the said aperture 12a. An ignition chamber 11a is alined with the combustion chamber 11 and adapted to be communicated therewith through the inlet aperture 12a as by an arcuate inlet port 30 provided in the disc valve 27.

The rotary valve 27 also has a laterally extending arcuate abutment portion 31, adapted to engage the valve seat of the piston aperture 12; the abutment 31 extends substantially through a greater distance of arc than that subtended by the inlet port 30, and is so positioned with respect to said port as to engage said piston aperture 12 during the time that the ignition chamber is in communication with the combustion chamber. The said rotary disc valve 27 is journaled on a shaft 29 mounted on the engine and having its axis extending perpendicularly to the axis of the drive shaft 5, and is rotatably mounted in a housing 47, which acts to prevent leakage from the combustion chamber past the valve. Packing rings 48, as shown in Figure 14, are provided to form a closure between the said housing 47 and the said valve.

The closure between the abutment 31 of the rotary disc valve and the walls of the piston aperture 12 is effected by means of spring set T-shaped packing strips 49, as clearly shown in Figure 9, the shape of the packing strips 49 being such that they will not fall out of their respective seats when the rotation of the disc valve uncovers the piston aperture 12 for the passage of the pistons 8 therethrough.

For effecting the closure between the flywheel 6, chamber 10 and valve abutment 31, I provide a construction more particularly illustrated in Figure 10, wherein it will be seen that I extend the acuminate packing strips 41 so as to form a seat 50, engaging the spring set arcuate packing strip 51, seated in the edge 52 of the abutment 31.

The packing strip 51 is formed with a flared end 53 where it engages the seat 50 of the acuminate strip 41, the said flared end 53 extending to the point of intersection between the top of the lip 31 and the edge 52 thereof.

Each wall of the combustion chamber 11 is formed with a reentrant cutout 54 as shown in Figure 10, so as to provide a seat 54a for engaging the packing strip 51.

As will be clearly seen in Figure 9, the periphery of the flywheel 6 will also engage the packing strip 51, so that the periphery of the flywheel, the extended portions of the acuminate rings, and the cutouts 54 form a continuous surface or seat, for the packing strip 51, thus forming a simple and effective closure.

The packing strip 51 is provided with a lug 55 cooperating with a recess 55a in the gate 31, in order to prevent the displacement of the strip 51, under pressure from the springs 56, when the gate 31 is not in alinement with the aperture 12. It will be seen that the T-shaped packing strips 49 extend into the cutout 54, thereby completing the closure.

A crank shaft 23 is journaled in bearings 3 mounted on the frame 1; the axis of the crank shaft extends at right angles to the axis of the drive shaft, and is driven therefrom as by gears 24. The outer end of the crank shaft 23 is geared to a countershaft 32, journaled on the frame 1, as by gears 33, and the countershaft 32 drives the rotary valve 27 as by gears 28.

A compression cylinder 13 is mounted on the frame 1 and has a reciprocable piston 25 positioned therein, said piston being operable from the crank shaft 23 as by a connecting rod 26. The said compression cylinder 13 is provided with an intake port 14 and an exhaust port 15. An intake valve compartment 17 and an exhaust valve compartment 18 are incorporated in the head of the cylinder 13. The exhaust valve compartment 18 is connected with the ignition chamber 11a by means of a duct 19, while the intake valve compartment is connected with the carburetor (not shown). Valve balls 20 and 21 are located in the intake and exhaust valve compartments, respectively, and are adapted to engage the valve seats of the said valve compartments. A spring set valve 22 is mounted in the duct 19 in the ignition chamber 11a to prevent the ignition of the combustible material in said duct.

A spark plug 35 is secured in the ignition chamber 11a and connected to a terminal 36 mounted on the housing 47; a terminal 37 is mounted on the housing 47 in alinement with the terminal 36, and is connected with a suitable source of electricity (not shown). A contact cam 38 is insulatably mounted on the rotary valve disc 27 and adapted to close the circuit thru the terminals 36 and 37 for operating the spark plug.

In use, the rotation of the drive shaft 5 drives the crank shaft 23 at a suitable speed thru the gears 24, which causes the piston 25 to reciprocate in the cylinder 13. On the downstroke of the piston 25 combustible material is drawn into the cylinder 13 thru the intake valve compartment 17 from the carburetor (not shown), and upon the up-stroke of the piston, the combustible material is compressed and forced thru the exhaust valve compartment 18, duct 19 and past the spring set valve 22 into the ignition chamber 11a.

The rotary valve 27 is driven from the crank shaft 23 thru the gears 28 and 33. The rotary valve is co-ordinated with the movement of the piston 25, so that at the beginning of the up-stroke of said piston the ignition chamber 11a is partitioned from the combustion chamber 11 until the piston 25 reaches the top of its compression stroke, whereupon the inlet port 30 communicates the ignition chamber with the combustion chamber, while at the same time the spark plug is caused to ignite the combustible material in said ignition chamber as it passes into the combustion chamber.

The abutment 31 has in the meantime closed the piston aperture 12, the piston having beforehand passed therethrough slightly before the combustible material is ignited and admitted into the combustion chamber; by the construction described it will be seen that I provide an expansion chamber between the moving piston and the combustion chamber, thus permitting the movement of the piston to absorb the power resident in the expanding gases so as to rotate the drive shaft.

While I have herein described a certain specific method of constructing and assembling the elements of my invention, it is understood same may be varied in minor details, not departing from the spirit of my invention as defined in the appended claims.

I claim:

1. A rotary engine of the character described, comprising an annular expansion chamber, a flywheel disposed concentrically said chamber, a piston concentrically engaging said expansion chamber and mounted on said flywheel, a rotatable disc associated with the chamber, the axis of the disc being in the plane of the flywheel and perpendicular to the axis thereof so as to have its face tangentially disposed to the chamber, and an arcuate abutment mounted on the disc, a portion of the chamber being extended to engage said disc and said abutment, and said disc having a port radially outwardly from the abutment adapted to communicate with said chamber.

2. A rotary engine of the character described, comprising an annular expansion chamber, a flywheel disposed concentrically said chamber, a piston concentrically engaging said expansion chamber and mounted on said flywheel, said chamber being tangentially extended at one end so as to provide angularly disposed valve seats adapted to have said piston passed therethrough, a rotatable disc associated with the chamber and having its axis in the plane of the flywheel and perpendicularly disposed to the axis thereof, said disc engaging one of the valve seats of the said chamber extension, and an arcuate abutment mounted on the disc adapted to intermittently engage the other of said valve seats.

3. In a device of the kind described, an annular expansion chamber having its inner peripheral wall slotted, a bywheel mounted concentrically within the said chamber and having its periphery loosely extended through the said slot in the expansion chamber, a piston mounted on the flywheel for rotation within the expansion chamber, annular bulges formed on the periphery of the flywheel at each side thereof and spaced from the walls of the slot in the expansion chamber, concaved annular packing seats formed upon the edge of the slot in the expansion chamber and annular packing strips having concaved faces to engage the bulges on the flywheel and the packing seats on the edge of the slot in the expansion chamber and bridge the space therebetween, the outer face of the said packing strips being concaved complementary to the curvature of the piston in the expansion chamber.

4. In a device of the kind described, in combination with an annular expansion chamber having a peripherally extended slot through its inner wall and a flywheel loosely extended through the said slot, annular convexed packing seats formed along the edges of the said slot, annular convexed bulges formed on the flywheel and spaced from the said packing seats, packing strips mounted between the edges of the slot and the flywheel, the said packing strips having relatively shallow concaved faces adapted to engage the said packing seats and the bulges on the flywheel and spring set means operatively connected to the said packing strips and adapted to draw the same inward between the flywheel and the expansion chamber.

In testimony whereof I affix my signature.

FREDERICK STONE.